(12) United States Patent
Miller et al.

(10) Patent No.: US 12,356,179 B2
(45) Date of Patent: Jul. 8, 2025

(54) SYSTEMS AND METHODS FOR USER AUTHENTICATION

(71) Applicant: STATE FARM MUTUAL AUTOMOBILE INSURANCE COMPANY, Bloomington, IL (US)

(72) Inventors: Philip H. Miller, Mahomet, IL (US); Duane Christiansen, Eureka, IL (US); Derek Krut, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 554 days.

(21) Appl. No.: 17/489,443

(22) Filed: Sep. 29, 2021

(65) Prior Publication Data

US 2022/0210149 A1    Jun. 30, 2022

Related U.S. Application Data

(60) Provisional application No. 63/132,468, filed on Dec. 30, 2020.

(51) Int. Cl.
*H04W 12/02*       (2009.01)
*G06Q 40/08*       (2012.01)
*H04L 9/40*        (2022.01)

(52) U.S. Cl.
CPC .......... *H04W 12/02* (2013.01); *G06Q 40/08* (2013.01); *H04L 63/0853* (2013.01); *H04L 63/0876* (2013.01); *H04L 63/102* (2013.01)

(58) Field of Classification Search
CPC .............. H04W 12/02; H04L 63/0853; H04L 63/0876; H04L 63/102; G06Q 40/08
See application file for complete search history.

(56) References Cited

U.S. PATENT DOCUMENTS

| 10,826,895 | B1   | 11/2020 | Krut et al. |
| 11,405,504 | B1 * | 8/2022  | Tripathy ............... H04L 9/3213 |
| 2009/0077176 | A1 * | 3/2009 | Shae ................... H04L 12/1818 709/204 |

(Continued)

OTHER PUBLICATIONS

U.S. Appl. No. 62/992,374, filed Mar. 20, 2020, 30 pages.*

(Continued)

*Primary Examiner* — Victor Lesniewski
(74) *Attorney, Agent, or Firm* — MARSHALL, GERSTEIN & BORUN LLP

(57) ABSTRACT

The following relates generally to data retrieval and user authentication. In some embodiments, a user is authenticated in a native mobile application. The native mobile application then obtains an authorization code, and calls an application programming interface (API) to store contextual data about the user. The API then returns, to the native mobile application, a retrieval data token. The native mobile application then launches a chat application via a universal resource identifier (URI), and passes an identification (ID) parameter to the chat application. The chat application then passes the ID parameter to a customer service provider, which then retrieves an access token based upon the authorization code. The customer service provider then retrieves, from the API, the contextual data based upon the: (i) access token, and (ii) retrieval data token.

19 Claims, 6 Drawing Sheets

(56) References Cited

U.S. PATENT DOCUMENTS

| | | | | |
|---|---|---|---|---|
| 2016/0162905 | A1* | 6/2016 | Singh | G06F 21/31 |
| | | | | 705/304 |
| 2017/0140449 | A1* | 5/2017 | Kannan | G06Q 30/016 |
| 2017/0330195 | A1* | 11/2017 | Lange | G06F 3/04817 |
| 2018/0026959 | A1* | 1/2018 | Votaw | H04L 63/083 |
| | | | | 726/7 |
| 2018/0246623 | A1* | 8/2018 | Peled | G06F 3/04886 |
| 2018/0321989 | A1* | 11/2018 | Shetty | H04W 4/21 |
| 2019/0356562 | A1* | 11/2019 | Watkins | H04L 41/5064 |
| 2020/0106763 | A1* | 4/2020 | Pancholi | H04L 9/3213 |
| 2020/0204542 | A1* | 6/2020 | Nair | H04L 63/0884 |
| 2021/0042764 | A1* | 2/2021 | Rungta | H04L 63/0853 |
| 2021/0288927 | A1* | 9/2021 | Wang | G06K 7/1417 |
| 2022/0015073 | A1* | 1/2022 | Sarin | H04W 76/15 |
| 2022/0019681 | A1* | 1/2022 | Yarabolu | G06F 21/6245 |

OTHER PUBLICATIONS

Deepika, Kanakamedala; Tilekya, Veeranki; Mamatha, Jatroth; Subetha, T; "Jollity Chatbot—A contextual AI Assistant," Third International Conference on Smart Systems and Inventive Technology (ICSSIT), Tirunelveli, India, Aug. 20-22, 2020, pp. 1196-1200.*

Cha, Shi-Cho; Li, Zhuo-Xun; Fan, Chuan-Yen; Tsai, Mila; Li, Je-Yu; Huang, Tzu-Chia; "On Design and Implementation a Federated Chat Service Framework in Social Network Applications," IEEE International Conference on Agents (ICA), Jinan, China, Oct. 18-21, 2019, pp. 33-36.*

* cited by examiner

SYSTEMS AND METHODS FOR USER AUTHENTICATION

CROSS-REFERENCE TO RELATED APPLICATIONS

This application claims the benefit of U.S. Provisional Application No. 63/132,468 (filed Dec. 30, 2020), the entirety of which is incorporated by reference herein.

FIELD

The present disclosure relates generally to data retrieval and user authentication.

BACKGROUND

In today's modern word, many smartphones run a multitude of applications (apps). In some instances, many of the various apps running on a smartphone are unrelated to each other, and the data used by one app is irrelevant to the other apps. However, in some situations, the data relevant to one app is also relevant to another app. For example, a user may open an insurance app to view an insurance claim, and thereafter the user may wish to send a text message (e.g., through a text messaging app, such as a business chat app) to an insurance agent to discuss the insurance claim. In this example, data, such as data of the insurance claim, may be relevant to both the insurance app and the text messaging app; yet, there may be no convenient way for the text messaging app to access the insurance claim data from the insurance app.

The systems and methods disclosed herein provide solutions to these problems and others.

SUMMARY

In one aspect, there is a computer-implemented method for data retrieval based on user authentication. The method may include: authenticating a user in a native mobile application; obtaining, with the native mobile application, an authorization code; calling, with the native mobile application, an application programming interface (API) to store contextual data; returning, from the API to the native mobile application, a retrieval data token; launching, with the native mobile application, a chat application via a universal resource identifier (URI), and passing an identification (ID) parameter to the chat application, wherein the ID parameter comprises: (i) the authorization code, and (ii) the retrieval data token; passing the ID parameter from the chat application to a customer service provider; retrieving, with the customer service provider, an access token based upon the authorization code; and retrieving, with the customer service provider and from the API, the contextual data based upon the: (i) access token, and (ii) retrieval data token.

In another aspect, there is a computer-implemented method for data retrieval based on user authentication, the method may be performed by one or more processors of a user computing device. The method may include: authenticating a user in a native mobile application; obtaining, with the native mobile application, an authorization code; calling, with the native mobile application, an application programming interface (API) to store contextual data; receiving, from the API to the native mobile application, a retrieval data token; launching, with the native mobile application, a chat application via a universal resource identifier (URI), and passing an identification (ID) parameter to the chat application, wherein the ID parameter comprises: (i) the authorization code, and (ii) the retrieval data token; and passing the ID parameter from the chat application to a customer service provider; wherein the authorization code and the retrieval data token allow the customer service provider to retrieve the contextual data.

In yet another aspect, there is a computer-implemented method for data retrieval based on user authentication, the method may be performed by one or more processors of a customer service provider. The method may include: receiving an ID parameter from a chat application, wherein: (i) the ID parameter comprises an authorization code and a retrieval data token, and (ii) a user was authenticated in a native mobile application that called an application programming interface (API) to store contextual data; retrieving an access token based upon the authorization code; and retrieving, from the API, the contextual data based upon the: (i) access token, and (ii) retrieval data token.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

The present embodiments relate to, among other things, data retrieval and user authentication.

Example Infrastructure

Figure 1:
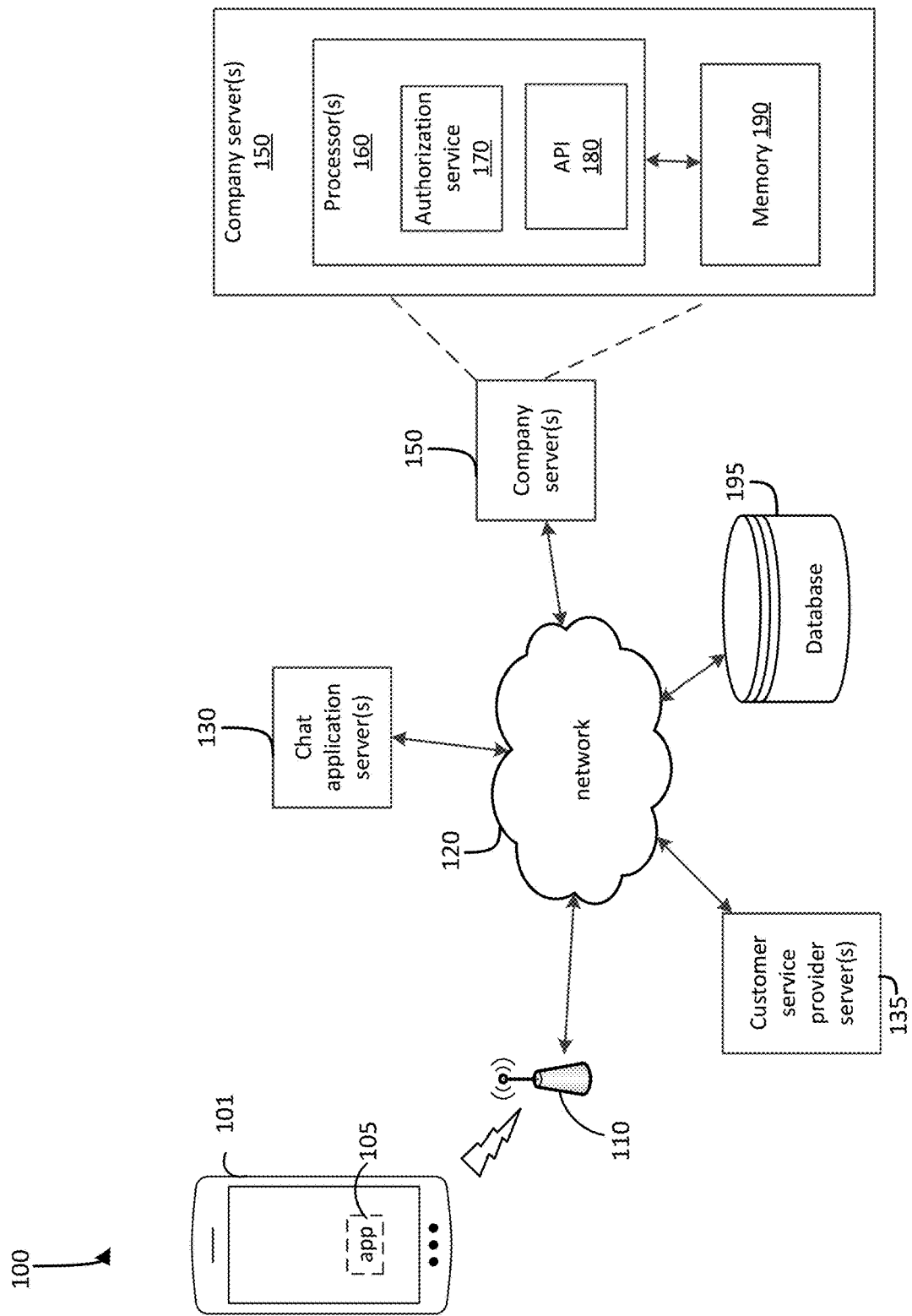
FIG. 1 shows an embodiment of an example infrastructure.

FIG. 1 shows an example embodiment of the systems and methods disclosed herein. With reference thereto, computing device 101 (e.g., a phone, smartphone, personal computer, tablet, etc.) may be connected to computer network 120 through base station 110. Computer network 120 may comprise a packet based network operable to transmit computer data packets among the various devices and servers described herein. For example, computer network 120 may consist of any one or more of Ethernet based network, a private network, a local area network (LAN), and/or a wide area network (WAN), such as the Internet. In addition, in some embodiments, computer network 120 may comprise cellular or mobile networks to facilitate data packet traffic (e.g., mobile device movement data) to and from base station 110. Base station 110 may comprise cellular towers or access points implementing any one or more cellular or mobile device standards, including, for example, any of GSM, UMTS, CDMA, NMT, LTE, 5G NR, or the like. In the example of FIG. 1, the chat application server(s) 130 (e.g., business chat server(s) 130), and customer service provider server(s) 135 are also connected to the computer network 120.

With further reference to FIG. 1, company server 150 is connected to the computer network 120. It should be understood that the term server as used herein may mean a single server or a group of servers. As is understood in the art, each server(s) includes processor(s) and memory. In the example of FIG. 1, the company server 150 includes processor(s) 160 (which includes authorization service 170 and application programming interface (API) 180, as described below) and memory 190. As is understood in the art, the processor 160 may be a single processor or as a group of processors. Furthermore, the authorization service 170 and the API 180 may be implemented together on a single processor or group of processors, or implemented each on their own processor. In addition, in some implementations, the API 180 is part of the authorization service 170 (e.g., the authorization service 170 includes the API 180).

In some embodiments, the computing device 101 may run an application (app) 105, such as a native mobile application (e.g., an app of an insurance service, a app of a retail store, etc.). For example, if the app 105 is a native app of an insurance company, the app 105 may be used to, e.g., retrieve information about an insurance claim, or to communicate with an insurance agent via communication through a text messaging app. In this regard, as used herein, a text message may refer to a short message service (SMS), a multimedia messaging service (MMS), or any other form of text message.

The example of FIG. 1 also illustrates database 195. In some embodiments, the database 195 includes a database of contextual data. In some implementations, the contextual data includes a customer ID (e.g., a customer name, social security number, or other identifier), and/or a claim ID (e.g., an insurance claim number). Although the example of FIG. 1 illustrates the database 195 separately from the company server 150, in some implementations, the database 195 is part of the company servers 150 (e.g., part of the memory 190, or separate from the memory 190).

Example Implementation

Figure 2:
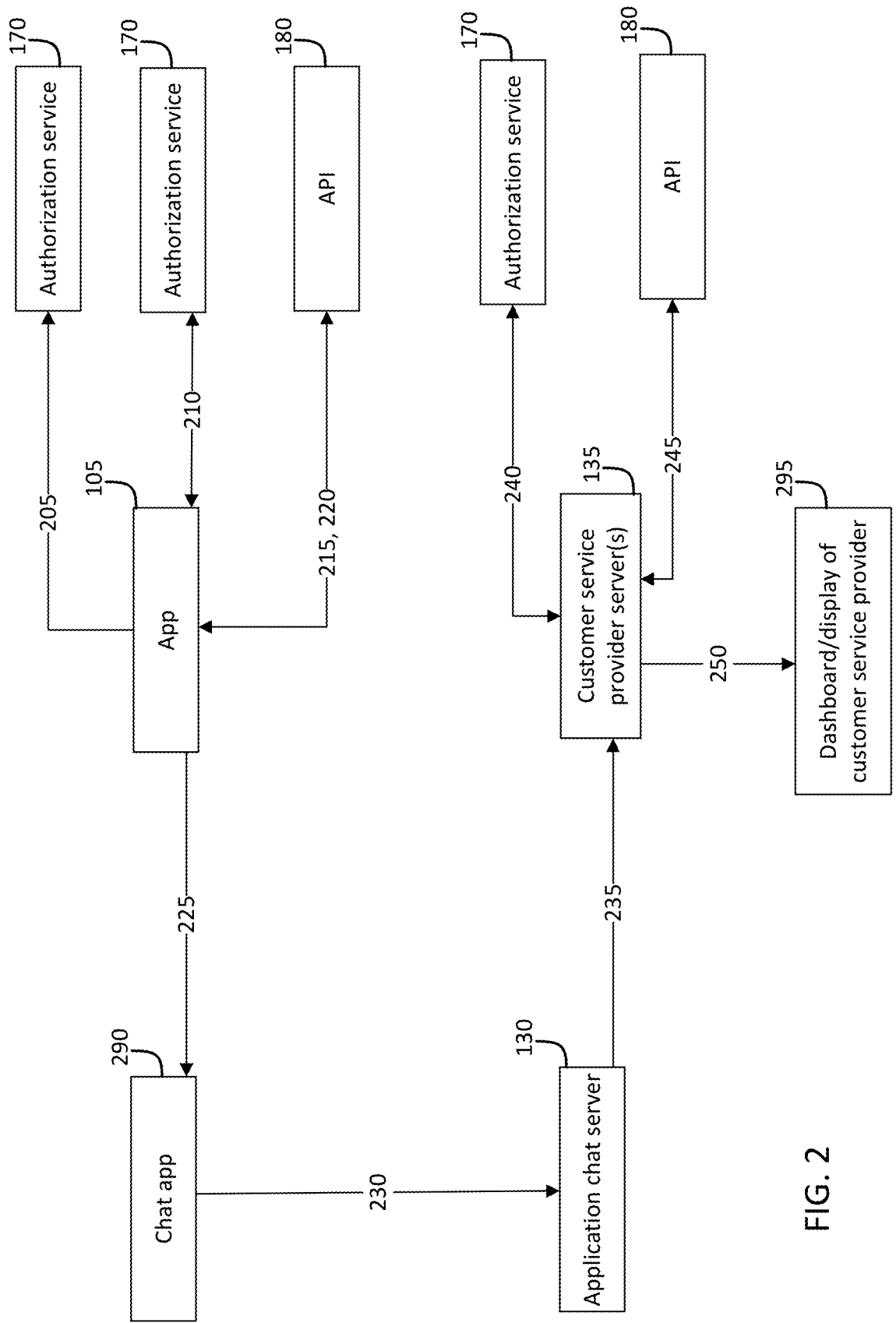
FIG. 2 shows an example implementation.

FIG. 2 illustrates an example implementation. With reference thereto, at operation 205 a user authenticates in a mobile application 105 (e.g., a native mobile application) via the authentication service 170. Any form of authentication may be used (e.g., authentication via a password, biometric information, two-factor authentication, etc.). In this regard, a single sign on (sso) token may be used to authenticate the user. Subsequently, at operation 210, the app 105 obtains an authorization code from the authorization service 170.

At operation 215, the app 105 calls the API 180 to store contextual information about the customer (e.g., a customer ID, an insurance claim ID, a customer phone number, device information such as information identifying the device or information identifying an error occurring on the device, etc.). In particular, the contextual information may be information that it is useful for a customer service representative to view when the customer engages in a chat session with the customer service representative. At operation 220, the API 180 stores the provided contextual information, and provides a retrieval data token to the app 105. In this regard, as will be seen, the storing of the contextual information at operation 220 allows for the customer service representative to later access the contextual data without requiring the customer to reauthenticate.

At operation 225, the app 105 launches a chat app 290 (e.g., via a universal resource identifier (URI)), and passes parameters to the chat app 290. In some embodiments, the parameters are part of an ID parameter. In some embodiments, the parameters comprise two parameters, such as the authorization code and retrieval data token. In some implementations, there are character limitations placed on the parameters; for example, the total number of characters (for parameters individually or taken as a whole) may be limited, such as to 150 characters, 512 characters, etc. Although, at operation 225, the example of FIG. 1 illustrates the app 105 launching the chat app 290, the chat app 290 may also simply be launched by the computing device 101 from outside the app 105.

At operation 230, the customer initiates a chat conversation, and the parameters are passed to the application chat server 130. At operation 235, the application chat server 130 passes the parameters to the customer service provider 135.

Figure 3A:
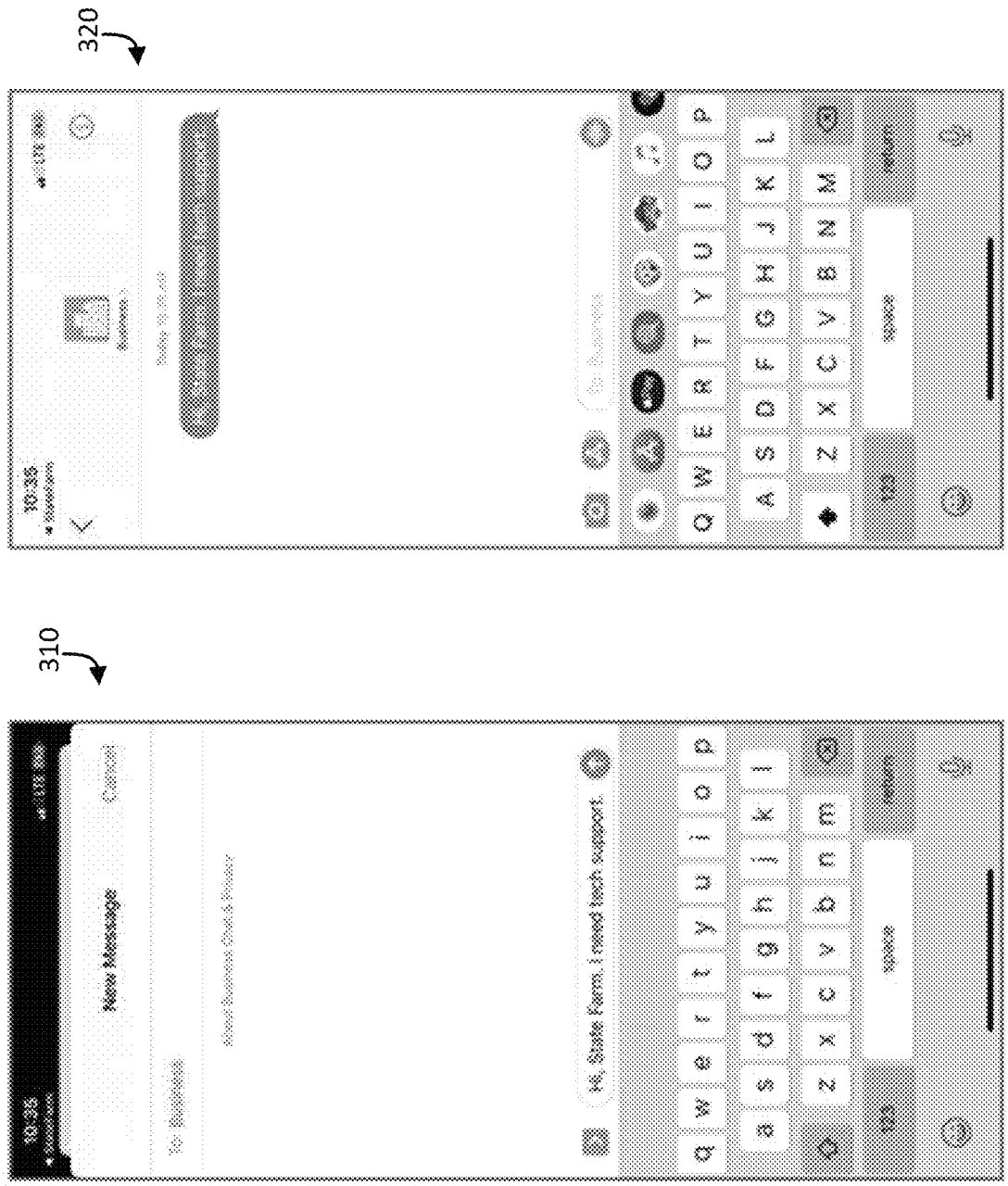
FIGS. 3A, 3B and 3C show example screen shots of chat initialization.
Figure 3B:
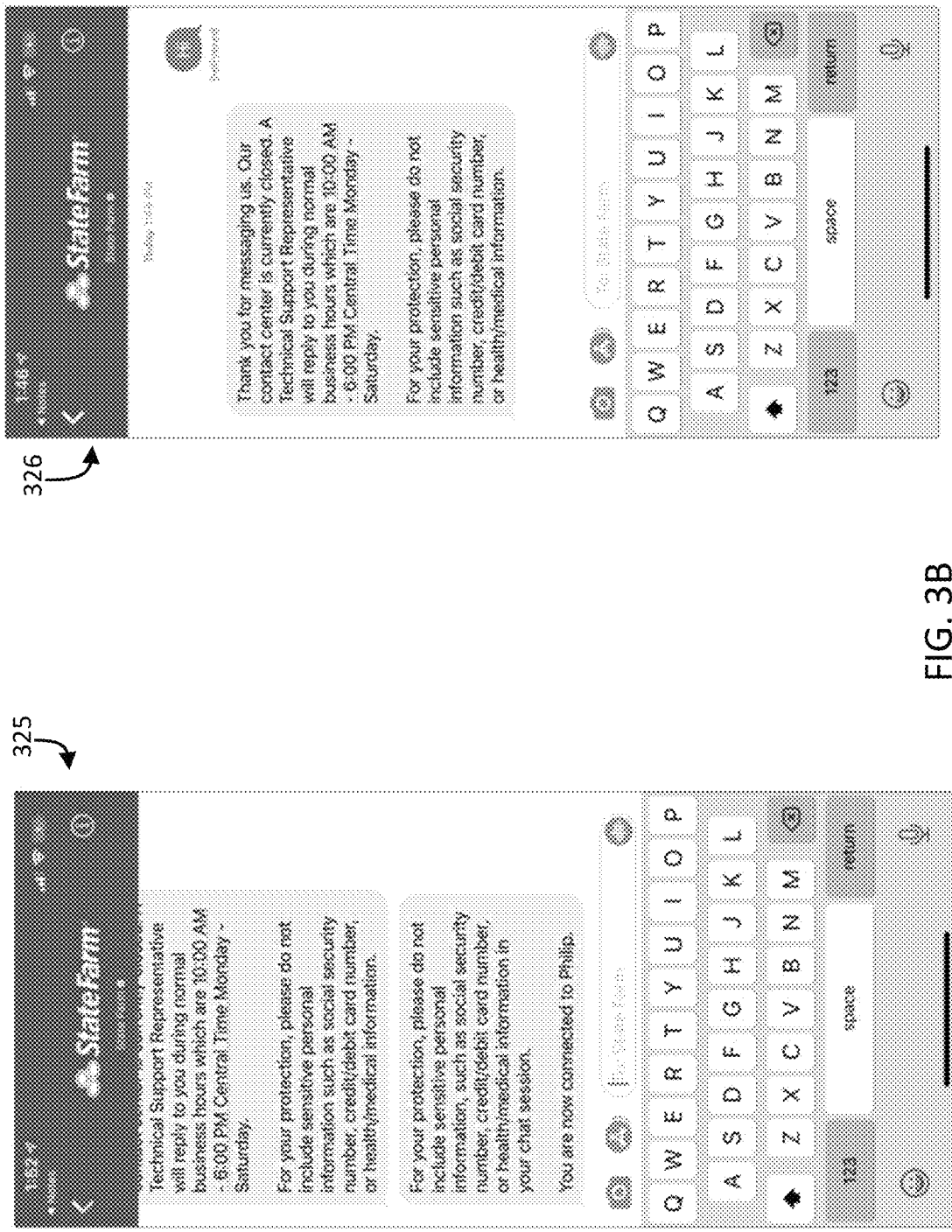
Figure 3C:
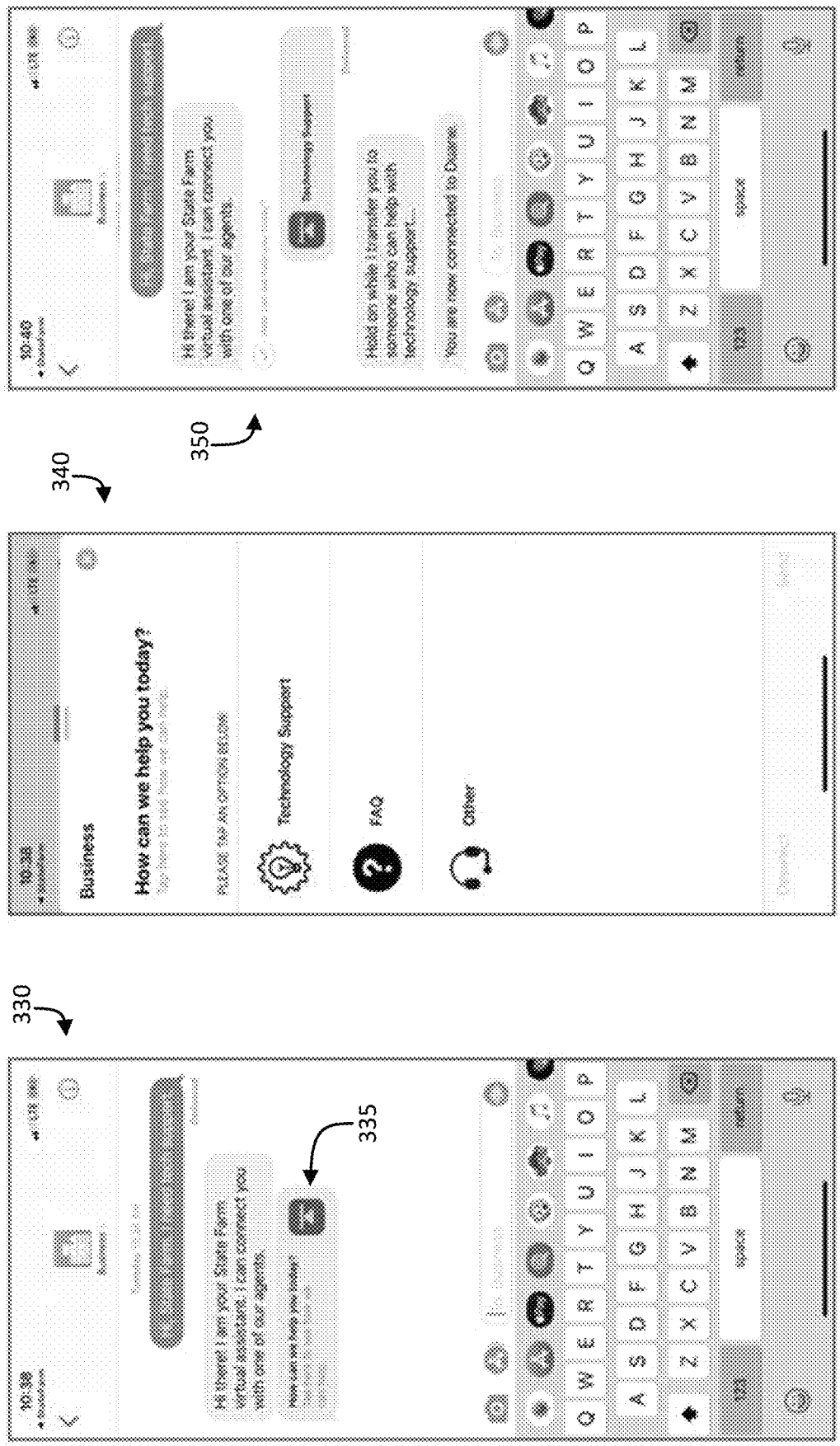

FIGS. 3A, 3B, and 3C show examples of chat initialization (e.g., operations 225, 230 and 235 of FIG. 2). With reference thereto, screenshots 310, 320 illustrate a user opening a chatbox, and sending a text message through the app 105. In some implementations, during normal business hours, a customer is connected directly to a support agent, as in the example of screenshot 325. In some embodiments, during off hours, the customer is provided with a message including hours and/or availability information, as in the example of screenshot 326. In some implementations, such as in the example of screenshot 330, the app 105 provides a virtual assistant to the user, which then provides link 335 to the user (however, the app 105 may provide the link 335 to the user regardless of whether a virtual assistant is used or not). The user may then click the link 335, which, in some embodiments, passes the parameters to the customer service provider 135 (e.g., operation 235 of FIG. 2). Screenshot 340 shows an optional screen that queries the user about the type of support that the user would like to receive. Screenshot 350 illustrates a screen confirming that the user has been connected.

Returning now to FIG. 2, at operation 240, the customer service provider 135 parses the parameters (e.g., parses the ID parameter that comprises the authorization code and retrieval data token), and determines routing. The customer service provider 135 may further call the authorization service 170 with the authorization code. The authorization service 170 may return an access token, and may further return a JSON Web Token (JWT).

At operation 245, the customer services provider 135 calls the API 180 with the access token and retrieval data token to retrieve the contextual information. At operation 250, the customer services provider 135 displays the contextual information from the API 180.

Additional Exemplary Embodiments

Figure 4:
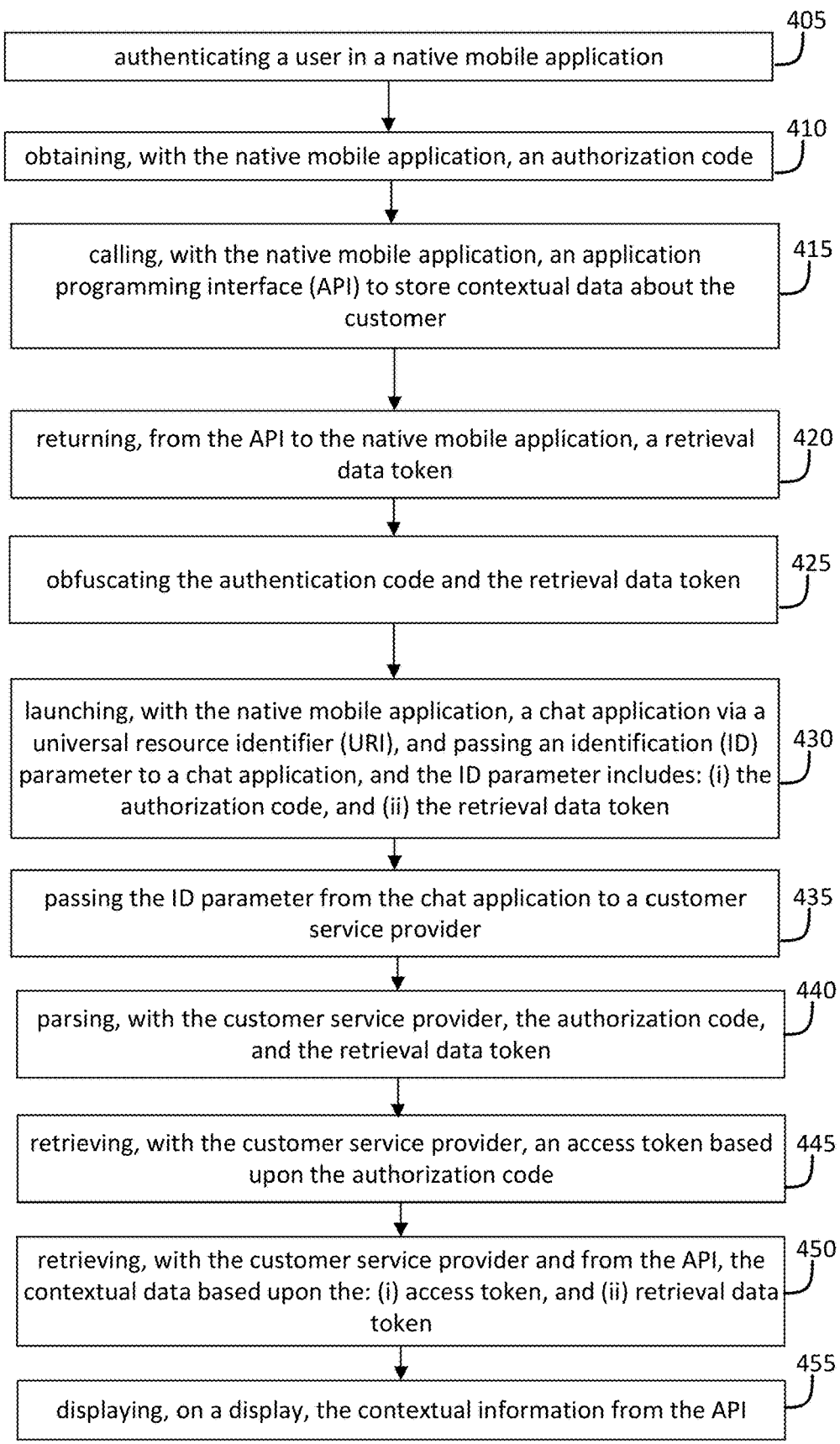
FIG. 4 illustrates an example method.

FIG. 4 illustrates an example method for data retrieval based on user authentication. At block 405, an app 105 is authenticated in a computing device 101. To authenticate, any suitable technique may be used. For example, authentication based on a password or biometric data may be used. Furthermore, two-factor authentication may be used.

At block 410, an authorization code may be obtained by the app 105 (e.g., from authorization service 170 of company server 150). In some embodiments, the authorization code expires after a predetermined time period.

At block 415, the app 105 calls the API 180 to store contextual data about the customer. For example, the contextual data may include a customer ID (e.g., a number identifying the customer, the customer's name, the customer's social security number, etc.), an insurance claim ID (e.g., an insurance claim number), the customer's mailing and/or email address, the customer's phone number, retail order information, or any other information. In some implementations, the contextual data includes an insurance policy number (e.g., of an auto insurance policy, a homeowners insurance policy, a life insurance policy, a disability insurance policy, or any other kind of insurance policy), a vehicle identifier (e.g., a vehicle identification number (VIN)), and/or device data (e.g., information identifying the computing device 101, or an error occurring on a the computing device 101, etc.). In some embodiments, the contextual data may include a process identifier that identifies a step in a call center process, such as a call center process implemented by the customer service provider 135. In some embodiments, the contextual data includes analytic data of the user using the native mobile application 105, such as data regarding what the user has clicked on in the app 105; in some embodiments, the analytic data identifies a customer's journey in the app 105 up until the point in time that the contextual data is stored.

As will become apparent upon reading this disclosure, storing the contextual data in this way advantageously allows for the contextual data to be retrieved and/or displayed without the customer needing to authenticate again in another app.

In response to the calling of the API 180, at block 420, the API 180 returns, to the app 105, a retrieval data token. In some embodiments, the retrieval data token expires after a predetermined time period. At block 425, the authentication token and/or the retrieval data token are obfuscated (e.g., by the API 180), which advantageously allows for an additional layer of data security.

At block 430, the app 105 launches a chat application (e.g., via a URI), and passes an ID parameter to the chat app 290. In some embodiments, the ID parameter includes: (i) the authorization code, and (ii) the retrieval data token.

At block 435, the ID parameter (e.g., including the obfuscated authorization code and the obfuscated retrieval data token) is passed from the chat app 290 to the customer service provider 135. At block 440, the customer service provider 135 parses the ID parameter (e.g., parses the obfuscated authorization code and obfuscated retrieval data token). At block 445, the customer service provider 135 retrieves (e.g., from the authorization service 170) an access token based on the authorization code. In some embodiments, the customer service provider 135 also retrieves a JWT along with the access token. In some implementations, the access token and/or JWT expire after a predetermined time period.

At block 450, the customer service provider 135 retrieves (e.g., from the API 180) the contextual data based upon the: access token, retrieval data token, and/or the JWT. In some implementations, the contextual data is retrieved by calling the API 180 with the access token, the retrieval data token, token, and/or the JWT. At block 455, the retrieved contextual information is displayed on a display (e.g., to a customer service representative).

In some embodiments, some or all of the contextual data is deleted by the customer service provider 135 after conversation is closed, which advantageously even further improves data security.

Additional Exemplary Embodiments

Aspect 1. A computer-implemented method for data retrieval based on user authentication, comprising:
  authenticating a user in a native mobile application;
  obtaining, with the native mobile application, an authorization code;
  calling, with the native mobile application, an application programming interface (API) to store contextual data;
  returning, from the API to the native mobile application, a retrieval data token;
  launching, with the native mobile application, a chat application via a universal resource identifier (URI), and passing an identification (ID) parameter to the chat application, wherein the ID parameter comprises: (i) the authorization code, and (ii) the retrieval data token;
  passing the ID parameter from the chat application to a customer service provider;
  retrieving, with the customer service provider, an access token based upon the authorization code; and
  retrieving, with the customer service provider and from the API, the contextual data based upon the: (i) access token, and (ii) retrieval data token.

Aspect 2. The computer-implemented method of aspect 1, further comprising displaying, on a display, the contextual information retrieved from the API.

Aspect 3. The computer-implemented method of aspect 1, wherein the contextual data comprises:
  a customer ID,
  an insurance claim number,
  an insurance policy number,
  vehicle identifier,
  device data,
  a process identifier identifying a step in a call center process, or
  analytic data of the user using the native mobile application.

Aspect 4. The computer-implemented method of aspect 1, wherein, to retrieve the contextual data, the customer services provider calls the API with the access token and retrieval data token.

Aspect 5. The computer-implemented method of aspect 1, wherein: (i) the authorization code is obtained by the native mobile application from an authorization service, and (ii) the retrieving of the access token based upon the authorization code occurs by sending the authorization code to the authorization service.

Aspect 6. The computer-implemented method of aspect 1, wherein the authentication code and the retrieval data token are obfuscated before they are passed to the chat application.

Aspect 7. The computer-implemented method of aspect 1, wherein a JSON Web Token (JWT) is returned along with the access token, and the retrieval of the contextual data is further based on the JWT.

Aspect 8. The computer-implemented method of aspect 1, wherein the access token is prevented from being retrieved after a predetermined time period expires.

Aspect 9. The computer-implemented method of aspect 1, wherein the authorization code expires after a predetermined time period.

Aspect 10. A computer-implemented method for data retrieval based on user authentication, the method performed by one or more processors of a user computing device, the method comprising:

authenticating a user in a native mobile application;

obtaining, with the native mobile application, an authorization code;

calling, with the native mobile application, an application programming interface (API) to store contextual data;

receiving, from the API to the native mobile application, a retrieval data token;

launching, with the native mobile application, a chat application via a universal resource identifier (URI), and passing an identification (ID) parameter to the chat application, wherein the ID parameter comprises: (i) the authorization code, and (ii) the retrieval data token; and passing the ID parameter from the chat application to a customer service provider;

wherein the authorization code and the retrieval data token allow the customer service provider to retrieve the contextual data.

Aspect 11. The computer-implemented method of aspect 10, wherein the contextual data comprises a customer ID, or an insurance claim number.

Aspect 12. The computer-implemented method of aspect 10, wherein the contextual data comprises: (i) information identifying the user computing device, and (ii) an error occurring on the user computing device.

Aspect 13. The computer-implemented method of aspect 10, further comprising obfuscating the authentication code and the retrieval data token before passing the authentication code and the retrieval data token to the chat application.

Aspect 14. The computer-implemented method of aspect 10, wherein the access token is prevented from being retrieved after a predetermined time period expires.

Aspect 15. The computer-implemented method of aspect 10, wherein the ID parameter is passed to the customer service provider upon the user clicking a link.

Aspect 16. A computer-implemented method for data retrieval based on user authentication, the method performed by one or more processors of a customer service provider, the method comprising:

receiving an ID parameter from a chat application, wherein: (i) the ID parameter comprises an authorization code and a retrieval data token, and (ii) a user was authenticated in a native mobile application that called an application programming interface (API) to store contextual data;

retrieving an access token based upon the authorization code; and retrieving, from the API, the contextual data based upon the: (i) access token, and (ii) retrieval data token.

Aspect 17. The computer-implemented method of aspect 16, further comprising displaying, on a display, the contextual information from the API.

Aspect 18. The computer-implemented method of aspect 16, wherein the contextual data comprises a customer ID.

Aspect 19. The computer-implemented method of aspect 16, wherein the contextual data comprises an insurance claim number.

Aspect 20. The computer-implemented method of aspect 16, wherein the authentication code and the retrieval data token are received, by the one or more processors, as obfuscated, and wherein the method further comprises:

parsing the obfuscated authentication code and the obfuscated retrieval data token prior to retrieving the contextual data.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of ordinary skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for data retrieval based on user authentication, comprising:
   authenticating a user in a native mobile application;
   obtaining, with the native mobile application, an authorization code;
   calling, with the native mobile application, an application programming interface (API) to store contextual data;
   returning, from the API to the native mobile application, a retrieval data token;
   launching, with the native mobile application, a chat application via a universal resource identifier (URI), and passing an identification (ID) parameter to the chat application, wherein the ID parameter comprises: (i) the authorization code, and (ii) the retrieval data token;
   passing the ID parameter from the chat application to a customer service provider;
   retrieving, with the customer service provider, from an authorization service, an access token based upon the authorization code;
   retrieving, with the customer service provider and from the API, the contextual data based upon the: (i) access token, and (ii) retrieval data token; and
   displaying, on a display of the customer service provider, at least part of the contextual data without requiring reauthentication of the user into the chat application, wherein the displaying, on the display of the customer service provider, at least part of the contextual data without requiring reauthentication is enabled by the retrieval data token.

2. The computer-implemented method of claim 1, wherein the contextual data comprises:
   a customer ID,
   an insurance claim number,
   an insurance policy number,
   vehicle identifier,
   device data,
   a process identifier identifying a step in a call center process, or
   analytic data of the user using the native mobile application.

3. The computer-implemented method of claim 1, wherein, to retrieve the contextual data, the customer service provider calls the API with the access token and retrieval data token.

4. The computer-implemented method of claim 1, wherein: (i) the authorization code is obtained by the native mobile application from the authorization service, and (ii) the retrieving of the access token based upon the authorization code occurs by sending the authorization code to the authorization service.

5. The computer-implemented method of claim 1, wherein the authorization code and the retrieval data token are obfuscated before they are passed to the chat application.

6. The computer-implemented method of claim 1, wherein a JSON Web Token (JWT) is returned along with the access token, and the retrieval of the contextual data is further based on the JWT.

7. The computer-implemented method of claim 1, wherein the access token is prevented from being retrieved after a predetermined time period expires.

8. The computer-implemented method of claim 1, wherein the authorization code expires after a predetermined time period.

9. A computer-implemented method for data retrieval based on user authentication, the method performed by one or more processors of a user computing device, the method comprising:
   authenticating a user in a native mobile application;
   obtaining, with the native mobile application, an authorization code;
   calling, with the native mobile application, an application programming interface (API) to store contextual data;
   receiving, from the API to the native mobile application, a retrieval data token;
   launching, with the native mobile application, a chat application via a universal resource identifier (URI), and passing an identification (ID) parameter to the chat application, wherein the ID parameter comprises: (i) the authorization code, and (ii) the retrieval data token;
   passing the ID parameter from the chat application to a customer service provider; and
   retrieving, with the customer service provider, from an authorization service, an access token based upon the authorization code;
   wherein the access token and the retrieval data token allow the customer service provider to retrieve the contextual data, and display, on a display of the customer service provider, at least part of the contextual data without requiring reauthentication of the user into the chat application, wherein the displaying, on the display of the customer service provider, at least part of the contextual data without requiring reauthentication is enabled by the retrieval data token.

10. The computer-implemented method of claim 9, wherein the contextual data comprises a customer ID, or an insurance claim number.

11. The computer-implemented method of claim 9, wherein the contextual data comprises: (i) information identifying the user computing device, and (ii) an error occurring on the user computing device.

12. The computer-implemented method of claim 9, further comprising obfuscating the authorization code and the retrieval data token before passing the authorization code and the retrieval data token to the chat application.

13. The computer-implemented method of claim 9, wherein the access token is prevented from being retrieved after a predetermined time period expires.

14. The computer-implemented method of claim 9, wherein the ID parameter is passed to the customer service provider upon the user clicking a link.

15. A computer-implemented method for data retrieval based on user authentication, the method performed by one or more processors of a customer service provider, the method comprising:
- receiving an ID parameter from a chat application, wherein: (i) the ID parameter comprises an authorization code and a retrieval data token, and (ii) a user was authenticated in a native mobile application that called an application programming interface (API) to store contextual data and that launched the chat application via a universal resource identifier (URI), wherein the authorization code was obtained with the native mobile application and the retrieval data token was returned from the API to the native mobile application;
- retrieving, from an authorization service, an access token based upon the authorization code;
- retrieving, from the API, the contextual data based upon the: (i) access token, and (ii) retrieval data token; and
- displaying, on a display of the customer service provider, at least part of the contextual data without requiring reauthentication of the user into the chat application, wherein the displaying, on the display of the customer service provider, at least part of the contextual data without requiring reauthentication is enabled by the retrieval data token.

16. The computer-implemented method of claim 15, further comprising displaying, on the display, the contextual data from the API.

17. The computer-implemented method of claim 15, wherein the contextual data comprises a customer ID.

18. The computer-implemented method of claim 15, wherein the contextual data comprises an insurance claim number.

19. The computer-implemented method of claim 15 wherein the authorization code and the retrieval data token are received, by the one or more processors, as obfuscated, and wherein the method further comprises:
- parsing the obfuscated authorization code and the obfuscated retrieval data token prior to retrieving the contextual data.

* * * * *